C. C. HARBRIDGE.
VEHICLE WHEEL.
APPLICATION FILED JAN. 23, 1911.
1,067,982.
Patented July 22, 1913.
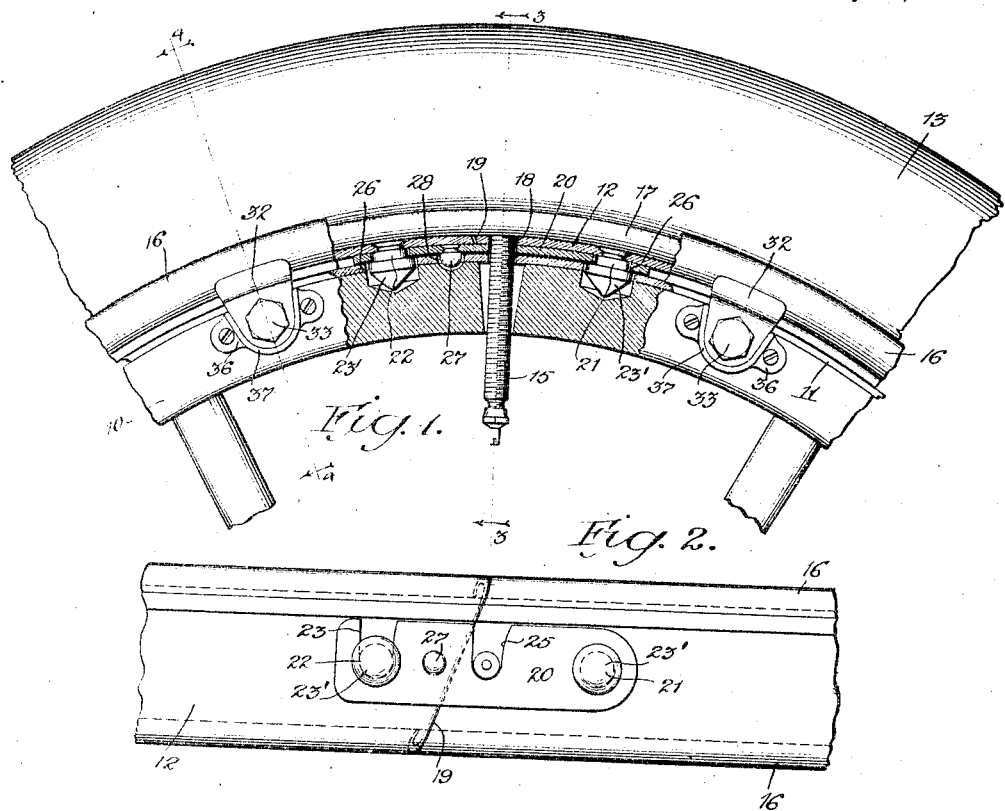
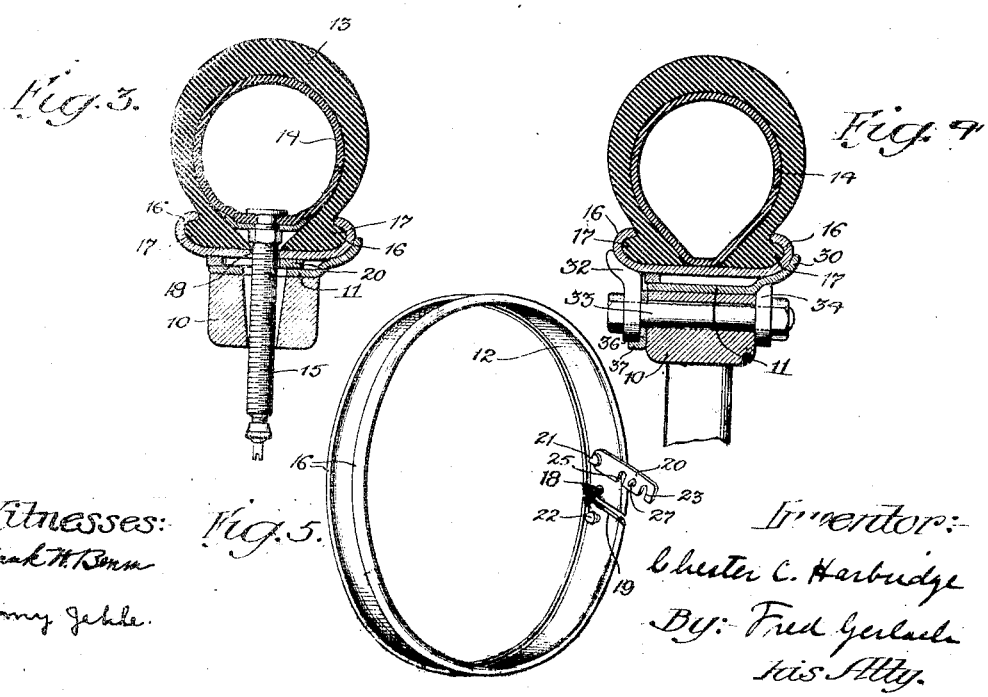
Witnesses:
Frank W. Benn
Amy Jahde
Inventor:
Chester C. Harbridge
By: Fred Gerlach
his Atty.

UNITED STATES PATENT OFFICE.

CHESTER C. HARBRIDGE, OF CHICAGO, ILLINOIS, ASSIGNOR TO DETROIT DEMOUNTABLE RIM CO., OF DETROIT, MICHIGAN, A CORPORATION OF MICHIGAN.

VEHICLE-WHEEL.

1,067,982.     Specification of Letters Patent.     Patented July 22, 1913.

Application filed January 23, 1911. Serial No. 604,109.

*To all whom it may concern:*

Be it known that I, CHESTER C. HARBRIDGE, a resident of Chicago, in the county of Cook and State of Illinois, have invented certain new and useful Improvements in Vehicle-Wheels, of which the following is a full, clear, and exact description.

The invention relates to vehicle-wheels and more particularly to wheel rims adapted to be equipped with pneumatic tires.

In pneumatic-tired wheels it is now common practice to employ demountable rims to facilitate replacement of the pneumatic tire. In this class of wheels it is desirable to also faciliate the removal and replacement of the tire, usually consisting of an inner tube and an outer casing, with respect to the removable rim and for this purpose the tire-rim has been split to permit it to be contracted within the tire casing.

The present invention designs to provide improved means for detachably connecting the ends of a rim adjacent the split, so that it may be clamped to a wheel body by the usual bolt or securing-devices.

Another object to the invention is to provide improved means for detachably connecting the ends of the rim adjacent the split in such manner that when the tire is deflated or removed, the rim will, none the less, remain secured on the wheel.

Still another object of the invention is to provide a demountable rim of improved construction.

The invention consists in the novel features, hereinafter set forth and more particularly defined by the claims at the conclusion hereof.

In the drawings Figure 1 is a side elevation of a portion of a wheel having the improved rim applied thereto, parts being shown in section. Fig. 2 is an inner face view of a portion of the demountable rim and the connecting plate. Fig. 3 is a section taken on line 3—3 of Fig. 1; Fig. 4 is a section taken on line 4—4 of Fig. 1. Fig. 5 is a perspective of the demountable rim.

The wheel-body may be of any suitable construction and comprises a felly 10 having an outer metallic band 11 shrunk thereon. A demountable rim 12 is adapted to extend around the band and, in cross-section, is formed to hold a pneumatic tire comprising an outer casing 13 and an inner tube 14 of usual construction. A valve 15 of usual construction is connected to the inner tube as well understood in the art. The rim comprises the usual flanges 16 in which ribs 17 on the tire casings are seated.

Rim 12 is split angularly and transversely as at 19, so that when it is removed from the wheel, it may be contracted or sprung inwardly and laterally to permit the tire to be readily placed thereon and removed therefrom. It will be understood that tire-casings are substantially inexpansible, and therefore the rim is split, so one end thereof can be readily sprung inwardly and laterally to facilitate its removal from the tire. The rim when contracted may be placed within the tire and then expanded until the casing is seated therein. A hole 18 is formed in this rim adjacent the split 19, for valve 15. In practice it has been found that when a split rim fits snugly the tire, the abutting ends of the rim are pressed together with such force that it is difficult to disengage them in order to spring one end of the rim within the other to contract the rim, and spring it laterally and to overcome this difficulty the contiguous ends of the rim are correspondingly beveled, so that the angled faces will overlap, and resultantly when the rim and tire are to be disconnected, any pressure exerted on the rim by the tire-casing, will not cause the ends of the rim to be forced together in such manner as to prevent the rim from being readily contracted, because the projecting inner end of the rim will be free to be pushed inwardly, and laterally when starting to remove the tire from the rim.

In order to connect the rim-ends and render the rim inexpansible, when on a wheel a connecting-plate 20 is pivotally connected to the rim, adjacent one end thereof, by a stud 21 and is adapted to be swung into engagement with or hook on a stud 22 which is riveted to the other end of the rim. This plate is adapted to swing laterally and when the rim is on a wheel it will be disposed between the rim and band 11 and fits against the inner face or periphery of the rim. The connecting plate is notched as at 23 to fit around stud 22 and to permit the plate to be swung laterally when the tire is to be removed from the rim and to permit the rim to be contracted. Resultantly, when this connecting plate is in operative position (Fig. 2) the rim will be inexpansible and when it is disengaged from stud 22 one end of the rim will be free to be forced inwardly relatively to the other. Each of the studs 21, 22 have a large head 23' which holds the plate snugly against the inner face of the rim. The plate has a notch 25 to receive the tire-valve. The projecting ends 23' of studs 21, 22 are tapered to enter perforations or sockets 26 in band 11 and to secure that portion of the rim adjacent the split against lateral movement relative to the wheel body. The plate is also provided with a lock-stud 27 adapted to project into a perforation or socket 28 in band 11 to lock the plate against lateral movement when the rim is on a wheel. Resultantly when the rim is secured on a wheel, the ends of the split rim will be held together by the connecting-plate and the latter will be locked against pivotal movement on stud 21 or movement which will permit the plate to swing laterally. Furthermore, the studs, fitting in holes or sockets on the wheel-body will secure the rim against lateral movement relative to the wheel on said band. Another important advantage of the construction set forth is that the connecting plate is held on the rim by means other than, or independent of, the tire and its valve and in such manner that the rim can be secured on the wheel without a tire being therein. This feature is of advantage in event that emergency should make it necessary to run on the rim.

The rim is removably held on a flange 30 on band 11 on which one side of the rim is seated, wedge-lugs 32 on which the other side of the rim is seated and bolts 33 which extend through lugs 34 on the opposite side of the wheel. These bolts are extended through brackets 36 which are secured to the felly and are provided with seats 37 for lugs 32.

In applying a tire to the rim it is only necessary to swing the connecting plate laterally so that one end of the rim will be free to be pushed inwardly or laterally, and so that the rim may be contracted and placed within the tire, after the tire valve has been placed through the opening 18 in the rim. After the tire has been applied, the connecting plate will be swung into operative position and the rim and tire will then be in condition to be applied to the wheel. By loosening bolts 33 and lugs 32 so that the latter may be swung inwardly, the valve may be inserted through the felly and studs 27, 21 and 22 will pass into the sockets in the wheel. The opposite portion of the wheel will then be swung inwardly so the rim will be in position to be clamped on the rim between flange 30 and lugs 32, by bolts 33. Obviously when the rim has been removed from the wheel the tire may be removed with equal facility, when the connecting plate is swung laterally, to permit one end of the rim to be pushed inwardly and laterally to facilitate the disconnection of the rim and tire. When the rim is on the wheel, stud 27 on the connecting plate will lock the plate against lateral movement.

The invention is not to be understood as restricted to the particular construction set forth since the same may be verified by the skilled mechanic, within the scope of the appended claims without departing from the spirit of the invention.

Having thus described the invention what I claim as new and desire to secure by Letters Patent is:

1. The combination with a wheel body of a tire rim which is split transversely to permit the ends to be flexed, means for detachably securing the rim on the wheel body, inwardly projecting studs on the ends of the rim respectively, each stud having an enlarged head at its inner end, spaced from the inner face of the rim, and a latch plate for detachably connecting the rim ends, held on the studs respectively and between the heads and the inner face of the rim.

2. In a wheel, the combination with a wheel-body, of a tire-rim which is split transversely, means for detachably securing the rim on the wheel-body, a latch-plate pivoted to one end of the rim, and a headed stud on the other end of the rim, said plate having a notch in one side for receiving said stud, and being free to be swung to the side of the rim.

3. In a wheel, the combination with a wheel-body, of a tire rim which is split transversely, means for detachably securing the rim on the wheel body, a latch-plate pivoted to one end of the rim, and a headed stud on the other end of the rim, said plate having a notch in one side for receiving said stud, being free to be swung to the side of the rim, and having another notch in its side through which the tire valve is adapted to extend.

CHESTER C. HARBRIDGE.

Witnesses:
FRED GERLACH.
FRANK W. BEMM.